Feb. 15, 1927.  
W. B. HUGHES  
DIAL GAUGE  
Filed March 27, 1923   2 Sheets-Sheet 1
1,617,485
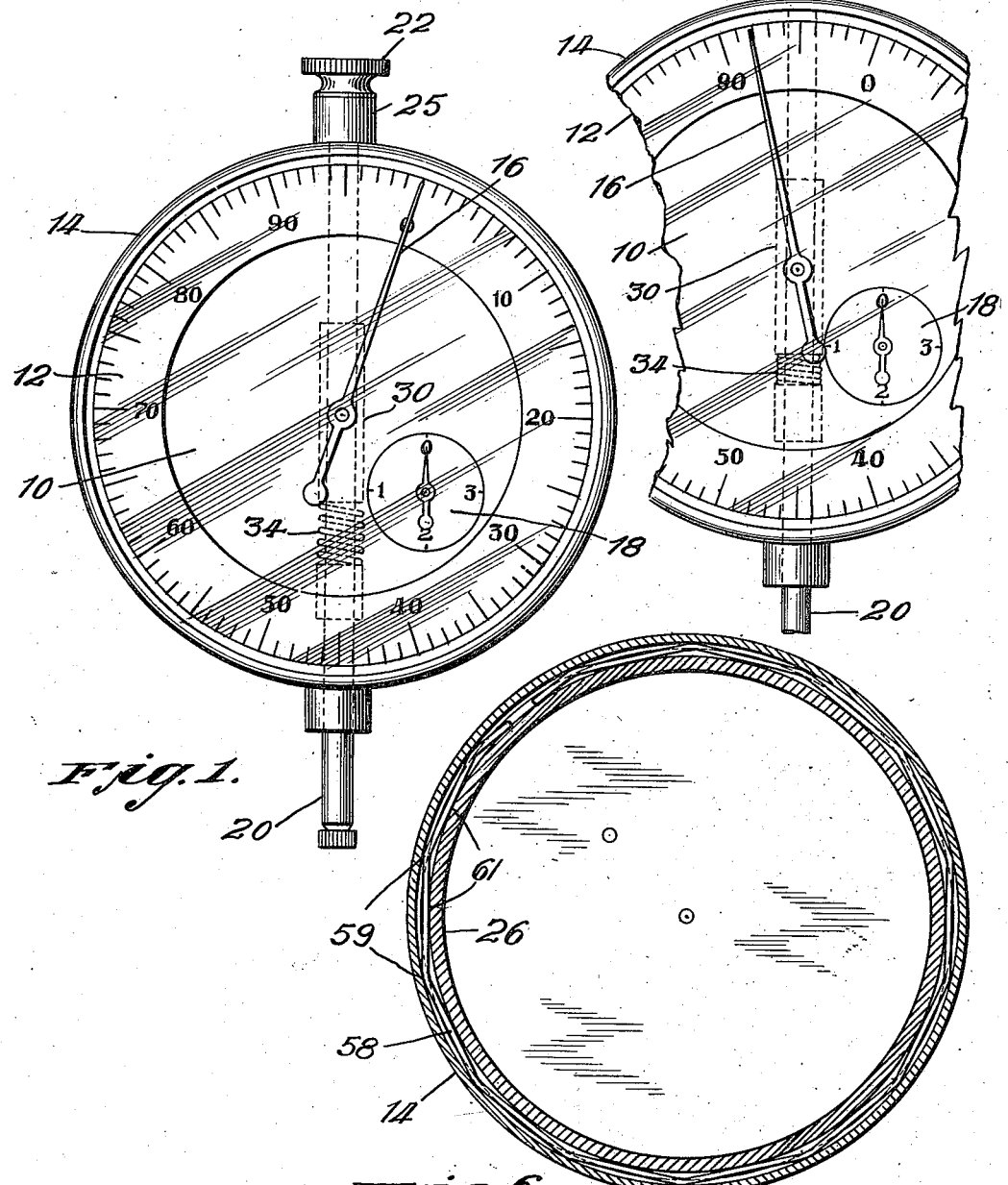
INVENTOR  
William B Hughes  
BY  
Moses, Hammond & Nolte  
ATTORNEYS

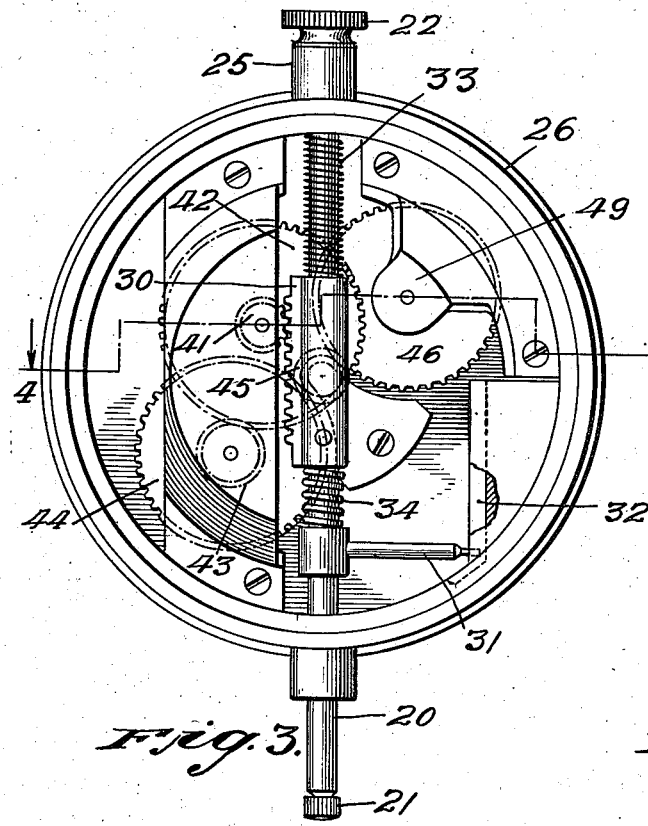
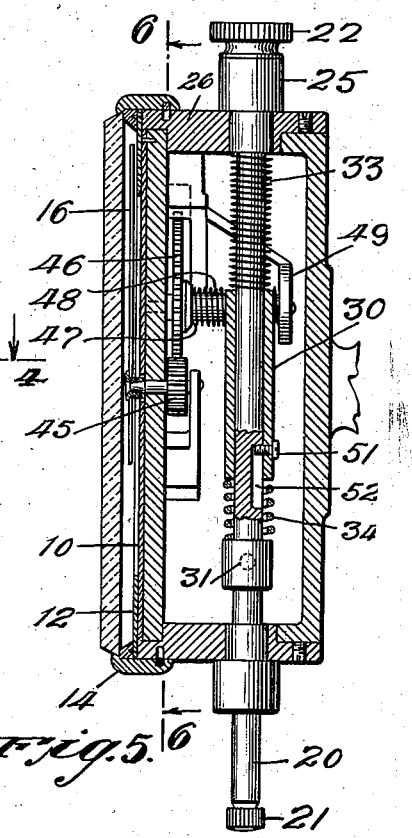
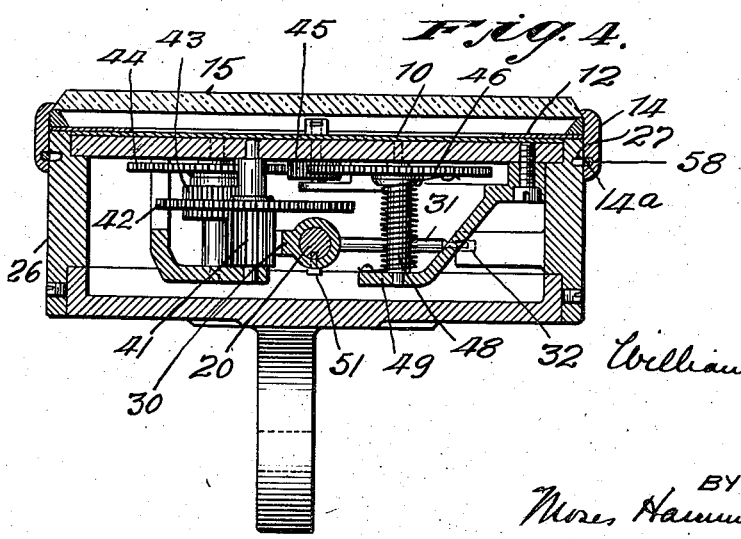

Patented Feb. 15, 1927.

1,617,485

UNITED STATES PATENT OFFICE.

WILLIAM B. HUGHES, OF WALTHAM, MASSACHUSETTS.

DIAL GAUGE.

Application filed March 27, 1923. Serial No. 627,984.

This invention relates to improvements in dial gauges of the type generally used for indicating small variations in machine parts and materials.

This invention has for its object the production of a dial gauge which will be so ruggedly constructed as to be suited for use by operatives not familiar with the care of delicate instruments, to be not liable to destruction by careless handling, which will be accurate to the limits of measurement usually employed for the finest work and adapted to retain that accuracy under conditions destructive to the delicate instruments previously employed.

More particularly the purposes of this invention are to provide cushioning means for the measuring mechanism, improved means for indicating and reading the measurements made, and improved means for mounting the indicating means and the glass cover for rendering such indications visible.

In the appended drawings, and description, like numerals have been employed to indicate like parts.

Figure 1 is a front elevation of the completed gauge.

Figure 2 is a fragmentary view of the gauge front shown in Figure 1.

Figure 3 is a rear elevation of the gauge with the back of the body removed.

Figure 4 is a section on line 4—4 in Figure 3.

Figure 5 discloses a vertical section taken on the center line, from front to rear, of the gauge shown in Figure 1.

Figure 6 shows a sectional view on line 6—6 in Figure 5, looking in the direction of the arrows.

The front elevation of the complete dial gauge embodying my invention, given in Figure 1, shows a dial face 10, an adjustable graduated dial ring 12, a bezel 14, an indicating hand 16, a hand revolution counter 18, and a reciprocatory contact member 20, which extends right through the gauge body, terminating in a thumb piece 22 above a top projection 25 of the gauge body 26.

The mechanism of the gauge is best understood from an inspection of Figure 3. It will be seen that the reciprocatory contact member 20 carries a contact shoe 21, rack 30, a guide bar 31, a retriever spring 33, and a rebound cushion spring 34.

The rack 30 engages, and drives, a pinion 41. Attached to pinion 41 is a gear 42 which engages a pinion 43 to which is attached a gear 44 meshing with a pinion 45 on the shaft which carries the indicating hand 16.

From a consideration of this gear train it will be seen that the movements of the reciprocatory member 20 are multiplied many times in their transmission to the indicating hand 16. Movements of a thousandth of an inch, or less, in member 20, will therefore cause a very considerable, and easily readable, indication on the gauge dial.

The gear motion for the hand revolution counter 18 has not been shown as it involves only a simple reducing gearing so arranged that the counter indicates the number of times which the indicating hand 16 has described a complete circle, or in other words, reads the 10th inches, if the hand 16 reads in 1000ths.

To return the indicating hand 16 to zero, and to assist in taking up any lost motion in the gearing train, a gear 46 is provided, having a shaft 47 upon which a spiral spring 48 is wound. One end of this spring 48 is secured to the bearing bracket 49 and the other to the gear 46. When the pinion 45 is driven by the multiplying gear train, it drives the gear 46, and winds up the spring 48, this spring presenting a force in the reverse direction to that produced by the upward movement of the reciprocating contact member 20 and keeping the teeth of all the gears always in contact, eliminating "backlash". Spring 48 assisted by spring 33 also acts to return the indicating hand 16 to zero, and the reciprocatory member 20 to its lowest position.

The guide bar 31 is secured rigidly to the member 20 at one end while its other end enters a guide slot 32 in the gauge body 26. The rack 30 is a sliding fit on the member 20, and is secured against rotation, while permitted limited independent vertical motion, by the screw 51 which enters the slot 52 in the member 20.

The guide bar 31 serves, where joined to the member 20, to form a seating shoulder for the rebound cushion spring 34 and also to retain the rack 30 in correct engagement with the pinion 41.

The rebound spring 34 is of heavier wire, and adapted to offer many times the resistance of spring 33. The normal position of the rack 30 is, therefore, that shown in Figure 5, namely with the screw 51 against the upper end of slot 52.

The indicating hand 16 attains considerable velocity when the reciprocatory member 20 is suddenly released from the object being measured. In gauges of this kind as heretofore constructed, a stop has been provided to limit the return movement of the indicating hand and stop it at zero. This has been objectionable because, although the mass of the parts is not great, the shock of suddenly stopping the mechanism was often sufficient to bend the indicating hand or cause it to twist on its shaft so as to render the instrument inaccurate. It was also essential to make the indicating hand as slender and light as possible, thereby tending to make the instrument more difficult to read. I have overcome these objections by the use of the rebound spring 34 and the movable rack whereby the shock of the rebound is absorbed by the spring as is most plainly seen from Figs. 1 and 2 in which the rack 30 and spring 34 are shown in dotted lines. When the indicating hand 16 is resting at zero as shown in Fig. 1, it will be noted that the rebound spring 34 is fully extended. Fig. 2 shows the position of the parts after a reading has been noted and the object measured suddenly removed, and at the instant when the hand would bring up with a heavy shock against the zero stop if such were used. Instead of the mechanism having to withstand this shock, however, it will be seen that the hand has swung past the zero position and the shock has been absorbed in compressing the rebound spring 34. When the hand 16 has been brought to a cushioned stop the spring 34 again expands to its normal length, bringing the parts to their normal relationship and the hand 16 to zero as shown in Fig. 1. Thus the spring 34 forms simple and effective means for cushioning and absorbing the rebound shock, and as the spring 34 has a much greater expansive force than the other springs, as already described, it does not interfere in any way with obtaining a correct gauge reading.

While the rebound spring 34, just described, absorbs the shock of stopping the hand and assures its return to zero, a means of adjusting the zero on the indicating scale to the initial position of the hand when work is first brought under the gauge, is most convenient where measurements of variations in the work are to be taken. It will be seen that the zero point for starting such measurement may fall at any point on the gauge face circle. To provide an adjustment which will enable the zero graduation to be made at any point in the complete circle of the gauge face, I provide a graduated dial ring 12 which is mounted in the bezel 14, and so arranged that the bezel and ring may be rotated about the body of the instrument. The dial plate 10 of the instrument is fixed and is thus enabled to carry the revolution counter 18, the hand of which is mounted on an arbor projecting through an opening in the face of the dial. If the entire dial were rotatable instead of only the graduated ring 12, it would not be possible to use a revolution counter of this character.

I have also provided an improved construction for securing the rotatable bezel to the instrument body which permits of ready assembly, provides the desired friction permitting of the rotation of the bezel while holding it in whatever position it may be moved to, and which is inexpensive and durable. This construction is particularly disclosed in Figs. 4 and 6.

In the sectional view Fig. 4, the bezel 14 carries the crystal 15, and the graduated dial ring 12 as an assembled unit. This unit is rotatably secured to the gauge body 26 by means of a circumferential body recess 27, an internal bezel recess 14ª and a locking wire 58. These recesses 14ª and 27 are cut in when turning up the gauge body 29 and the bezel 14, and do not require more than the simplest changes in the ordinary machine routine. The body recess 27 is preferably cut considerably deeper than the diameter of the locking wire 58, but only sufficiently wide to permit the easy entry of the wire into the recess. The bezel recess 14ª is of the same width as the body recess 27 and preferably of a depth equal to about one half the diameter of the wire. The locking wire 58 is shaped to the chords of a circle. In mounting the bezel, the glass 15 and the graduated ring 12 are first secured thereto. The locking wire 58 is then placed in the body recess 27 and squeezed to the bottom of this recess, and until the points 59 (caused by the meeting of the chords to which the wire has been bent) are even with the surface of the gauge body 26. The bezel may now be slipped over the gauge body until the recess 14ª registers with the bezel recess 27, whereupon the locking wire 58, being no longer held, snaps outward so that its points 59 engage the recess 14ª and are held securely in such position by the contact of the chord portions with the bottom of the gauge body recess 27 at points 61. (See Fig. 6.)

It will be seen that this method of locking is at once simple, positive, involves no difficult machine work, and eliminates the fine threads usually employed, while the bezel, carrying with it the graduated dial ring 12, may be revolved completely if necessary, and the graduated ring adjusted as may be desired, without danger of becoming separated from the gauge body by handling or vibration. The exterior surface of the bezel 14, may be knurled, if desired.

It is evident that many modifications in the construction of the parts and in the arrangement of the elements may be made. The particular arrangement of the gear train, of the springs, and of the gauge face, is not essential to my invention. In fact where the indications given by the counter 18 are not required, the entire gauge face may be attached to the bezel, instead of merely the graduated indicating ring 12 shown.

It will therefore be plain that many modifications in the elements, and in their arrangement, may be made without departing from the spirit of my invention, or the scope of the appended claims.

What I claim is:

1. In a gauge, in combination, a reciprocatory contact member controlled by the work, an indicator, a spring urging the parts to zero indicating position and a train constructed and arranged always to transmit with uniformly multiplied effect the motion of the contact member to the indicator, said train comprising a rack, positive abutment means limiting relative movement of the rack and contact member in one direction, and a spring under stress maintaining said abutment means normally in engagement so that the rack and contact member are constrained to move as a unit, said spring being yieldable to absorb the momentum of said train and indicator when they are moved to zero indicating position.

2. In a dial gauge, a reciprocatory contact member, an indicating hand, connections between said contact member and indicating hand comprising a multiplying gear train, a graduated dial and spring cushion means for said hand and gear train, said reciprocatory contact member being movable in one direction by material measured, said gear train multiplying said movement to enable small variations to be indicated at the dial by the indicating hand and means for moving the contact member in the opposite direction when disengaged by the material, said spring cushion means being arranged on the aforesaid reciprocatory contact member to cushion the rebound of said hand.

3. In a dial gauge, a contact member, an indicating hand and a multiplying gear train transmitting movement from said contact member to said indicating hand, said gear train including a connection which is yieldable in one direction only for permitting movement of said hand to a point behind zero position and said gear train being constructed and arranged to impose no limitation on the movement of the indicator away from zero position.

4. In a dial gauge, a reciprocatory contact member, an indicating hand and a multiplying gear train for transmitting motion from said contact member to said indicating hand, said gear train including a rack mounted for limited sliding movement on said reciprocatory contact member and a rebound spring tending to resist such movement.

5. A micrometer gauge provided with a stationary dial face, means acting over a limited area of said dial face for indicating measurements of one degree of fineness, mechanism projecting through said face for operating said indicating means, an adjustable graduated dial ring surrounding said face to indicate graduations of another degree of fineness, and a movable indicator co-operative with said dial ring.

6. In a dial gauge, a pointer, gauge mechanism for actuating said pointer, a dial ring co-operating with said pointer to provide an indicator, a body supporting and protecting said mechanism, a crystal forming a cover for said body and indicator, a bezel retaining said crystal and providing adjustment means for said dial, and a wire locking ring engaging said bezel and body to retain them in relatively adjustable relationship.

In testimony whereof I have affixed my signature to this specification.

WILLIAM B. HUGHES.